UNITED STATES PATENT OFFICE.

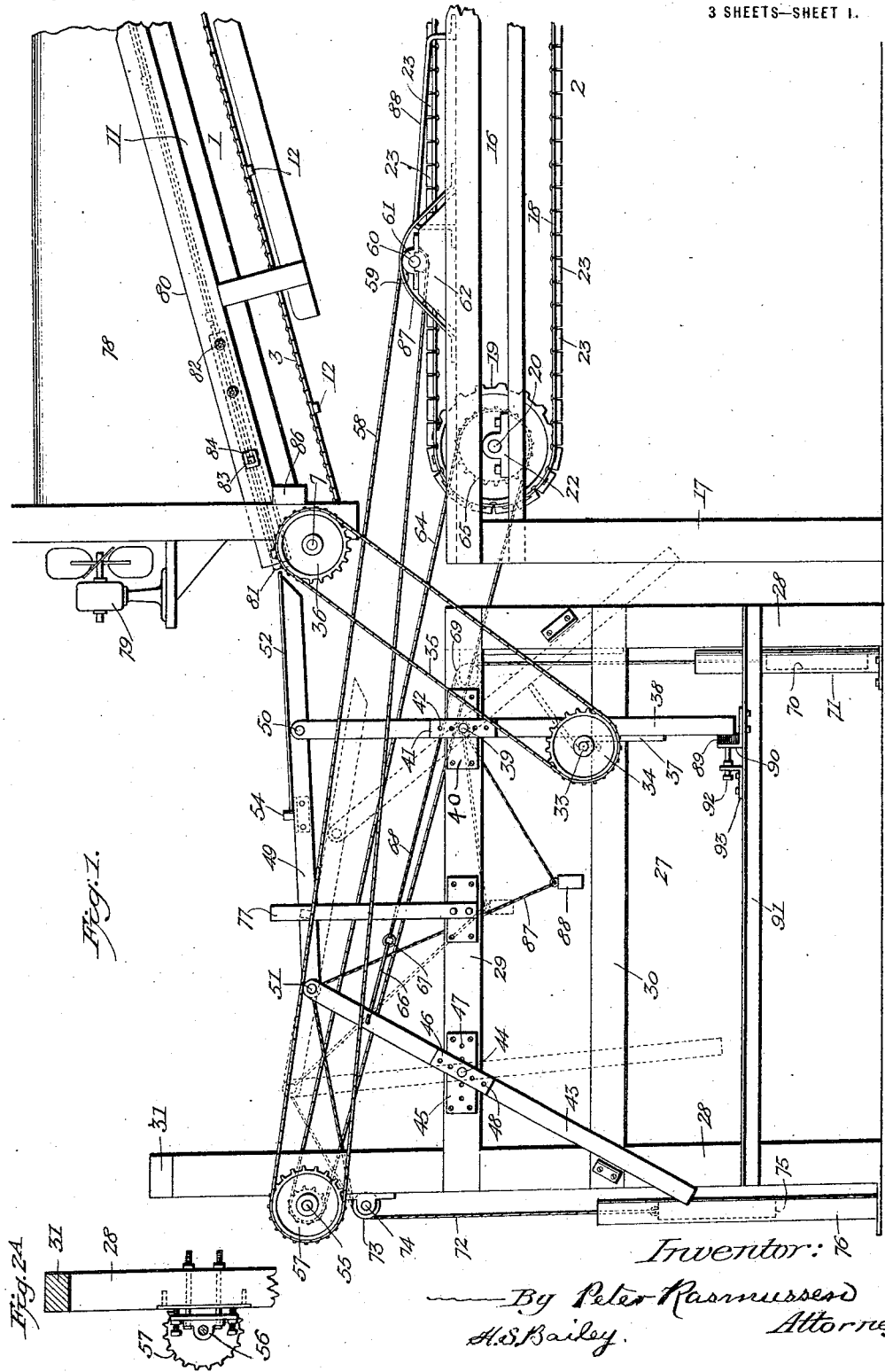

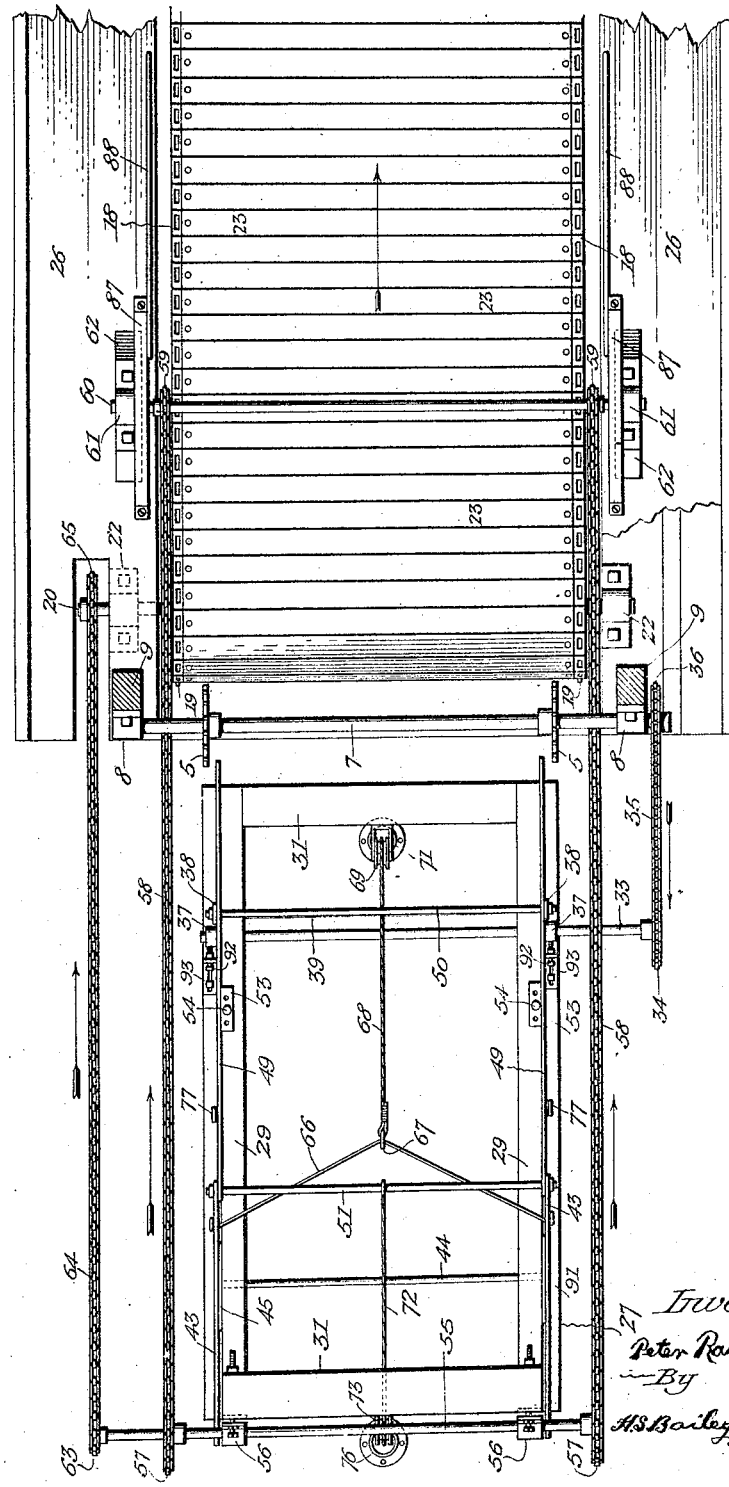

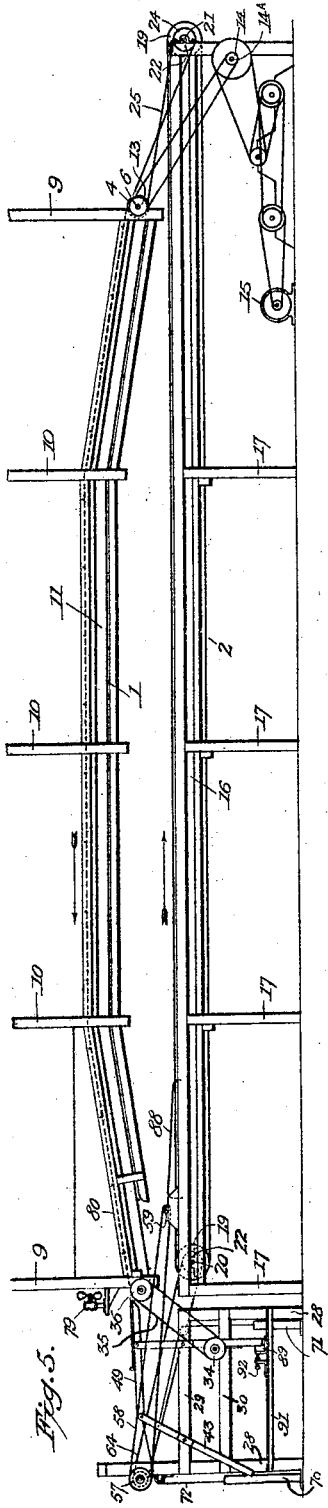

PETER RASMUSSEN, OF DENVER, COLORADO, ASSIGNOR OF ONE-HALF TO STEPHEN KNIGHT, OF DENVER, COLORADO.

MECHANISM FOR TRANSFERRING PANS OR OTHER OBJECTS FROM ONE CONVEYER TO AN OPPOSITELY-MOVING CONVEYER.

1,414,667.          Specification of Letters Patent.      Patented May 2, 1922.

Application filed August 30, 1920. Serial No. 406,927.

*To all whom it may concern:*

Be it known that I, PETER RASMUSSEN, a citizen of the United States of America, residing at the city and county of Denver and State of Colorado, have invented a new and useful Mechanism for Transferring Pans or Other Objects from One Conveyer to an Oppositely-Moving Conveyer, of which the following is a specification.

This invention relates to improvements in mechanism for transferring pans or other objects from one conveyer to an oppositely moving conveyer.

The object of the invention is to provide automatically operating mechanism for receiving pans, trays or other objects, from one conveyer, and transferring them to an oppositely moving conveyer, thus eliminating the services of an attendant for transferring the said pans or other objects.

Further to provide in combination with a cake cooling conveyer extending from a point adjacent to a bake oven, and a return conveyer for receiving the pans of cooled cakes, and returning the said pans to a point adjacent the receiving end of the cooling conveyer after the cakes have been removed therefrom; of transferring mechanism arranged to receive the pans of cakes from the discharge end of the cooling conveyer, and transfer them to the receiving end of the return conveyer, the said mechanism comprising pan-receiving arms, means for supporting and swinging said arms, and endless chains for receiving the pans from the said arms, and delivering them to the return conveyer, means being employed for regulating the movements of the said receiving arms relatively to the speed of the said cooling conveyer.

These objects are attained by the mechanism illustrated in the accompanying drawings, in which Figure 1 is a side elevation of the improved mechanism for receiving trays or pans from one conveyer and transferring them to an oppositely moving conveyer.

Fig. 2 is a plan of Fig. 1, the portion of the upper or cake cooling conveyer shown in Fig. 1 being omitted.

Fig. 2ᴬ is a side view of an adjustable bearing for the pan conveying chain shaft.

Fig. 3 is a plan view of the portion of the upper or cake cooling conveyer shown in Fig. 1.

Fig. 4 is a central, longitudinal sectional view of Fig. 3, the sprocket chain and wheel being indicated by dotted lines.

Fig. 5 is a side view partly in diagram, illustrating the cooling conveyer, the return conveyer, and the transferring mechanism for receiving the pans from the cooling conveyer and transferring them to the return conveyer.

Fig. 6 is a perspective view of a portion of one of the pan-receiving arms and the pan stop secured thereto.

Figs. 7 and 8 are side and plan views, respectively, of one of the cams for effecting the swinging movement of the pan-receiving arms, and Fig. 9 is a sectional view of a portion of one of the counterbalancing weights connected with the transferring mechanism.

In handling freshly baked cakes and other articles, in bakeries, the trays or pans of cakes are taken from the oven and placed upon an endless conveyer, of such length that in traveling from its receiving end to its opposite end, the cakes are cooled sufficiently to permit of handling; the pans are then transferred to an oppositely moving, or return conveyer, supported on a frame having side tables, upon which the cakes are deposited by attendants, so as to be packed, and the empty pans are placed again upon the return conveyer, which carries them to a point adjacent the oven, where the pans are removed, greased and supplied with fresh dough.

In the manner of operation employed in the present instance, the transferring of the pans from the cooling conveyer to the return conveyer was formerly accomplished by an attendant, but the present invention is designed to eliminate the services of an attendant, by providing automatically operating mechanism, located at the discharge end of the cooling conveyer, and arranged to receive the pans of cakes from the said cooling conveyer and transfer them to the return conveyer, which is preferably located beneath the cooling conveyer, the movements of the said transferring mechanism being regulated relatively to the speed of the cooling conveyer.

Referring to the accompanying drawings, the numeral 1, indicates the cooling conveyer, and 2, the return conveyer. The cooling conveyer comprises parallel, endless sprocket chains 3, which are mounted at opposite ends on pairs of sprocket wheels 4, and 5, on shafts 6 and 7, which are mounted in bearings 8, on depending timbers 9, and these timbers 9, together with intermediate timbers 10, support the frame-work 11, of the conveyer 1. This conveyer inclines upward from each end a short distance and then extends on a horizontal plane, the horizontal portion being approximately six feet above the floor, the timbers 9 and 10, being suspended from the ceiling. The chains 3 are connected at intervals by slats 12, which are spaced to correspond to the width of the pans, each pan, as it is taken from the oven, being placed on the chains, between two of the slats, and they are carried forward in this manner to the discharge end of the conveyer.

The receiving end of the conveyer is adjacent to the oven, and the shaft 6, at this end of the conveyer, is provided with a belt pulley or a sprocket wheel 13, which is connected by chains or belt to a corresponding wheel 14, on a shaft 14$^A$, which is driven from a suitable source of power, such as an electric motor 15.

The return conveyer 2, is preferably supported beneath the cooling conveyer 1, and about three feet above the floor. This conveyer extends from the discharge end of the conveyer 1, to a point a suitable distance beyond the opposite end of the said conveyer, and is supported upon a horizontal frame 16, which is supported at intervals upon legs 17.

The conveyer 2, comprises endless parallel sprocket chains 18, mounted on pairs of sprocket wheels 19, on shafts 20 and 21, which are supported in bearings 22, at opposite ends of the frame 16. The chains 18, are connected by slats 23, which are separated by only a slight space. The shaft 21, carries a sprocket wheel 24, which is connected by a cross chain 25, with a corresponding sprocket wheel on the shaft 6 of the conveyer 1, and the conveyer 2, is thus run in an opposite direction from the conveyer 1.

The frame of the conveyer 2, includes side tables 26, which extend parallel with the conveyer, and as the horizontal portion of the conveyer 1, is about six feet above the floor, it is out of the way of the attendants who take the pans from the return conveyer, empty them upon the said tables, and replace them upon the conveyer, as will hereinafter appear.

The conveyers 1 and 2, thus far described, are such as are in use in the present instance, but the discharge end of the conveyer 1, and the receiving end of the conveyer 2, are adapted to be connected with the improved transferring mechanism, which is constructed and arranged as follows:

Adjacent the forward end of the frame 16, which supports the conveyer 2, is a rectangular frame 27, which is about the same height as the frame 16, and comprises corner uprights 28, which are connected by longitudinal side rails 29 and 30, and by transverse bars 31, the forward uprights 28, extending some distance above the top of the frame.

Bearings 32, are adustably mounted on the side rails 30, and a shaft 33, is mounted in these bearings, on one end of which is rigidly secured a sprocket wheel 34, which is connected by a sprocket chain 35, with a sprocket wheel 36, on the shaft 7, of the conveyer 1, whereby power is transmitted to the shaft 33.

Upon the shaft 33, adjoining the outer faces of the side rails 30, are rigidly secured cam levers 37, which are adapted to engage and rock a pair of levers 38, which are loosely mounted intermediate of their ends, upon a cross rod 39, which is mounted in the upper side bars 29, and in metal plates 40, which are secured to the said side bars. The levers 38, have reinforcing plates 41, secured thereto, which are provided with a plurality of holes 42, registering with corresponding holes in the levers, and these holes permit up and down adustment of the levers with respect to the rod 39, upon which they are pivoted, so that the upper ends of the levers may swing in arcs of a suitable radius, as the levers are rocked by the cams 37, as will be more fully hereinafter set forth. Rock arms 43, similar to the levers 38, are mounted on a rod 44, which extends through the rails 29, and also through plates 45, secured on the rails.

The arms 43, are also provided with reinforcing plates 46, and both the plates 45 and 46, are provided with holes 47 and 48, respectively, by which the arms 43, can be adjusted with respect to the plates 45, and the arms 43, can be adjusted with respect to the rod 44, so that the arms 43, may be properly positioned with respect to the levers 38, and the upper ends of the arms 43, may swing in arcs of the proper radius for the purpose required.

In repose, the levers 38, are vertically disposed, while the arms 43, incline towards the levers 38, and the upper ends of the levers 38, and the arms 43, are connected by arms 49, which I term the pan-receiving arms, and these arms are pivotally connected to the levers 38, and to the arms 43, by cross rods 50 and 51, respectively. The arms 49, extend beyond the upper ends of the levers 38, to within a slight distance of the discharge end of the conveyer 1, in position to receive the pans 52, from the said conveyer, and the arms 49, are provided with angle plates 53, upon which pan stops 54, are adjustably secured. These stops limit the rearward movement of the pans on the arms 49.

A shaft 55, is mounted in adjustable bearings 56, on the upper portion of the rear uprights 28, of the frame 27, and this shaft has a pair of sprocket wheels 57, secured thereon, which are connected by sprocket chains 58, with smaller sprocket wheels 59, rigidly secured upon a shaft 60, which is mounted in bearings 61, which are secured upon blocks 62, which are secured to the tables 26, of the conveyer frame 16.

The shaft 60, is supported a slight distance above the conveyer 2, and the chains 58, have a downward inclination from the wheels 57, to the wheels 59, and are adapted to receive the pans from the arms 49, and pass them on to the conveyer 2, as will be hereinafter set forth.

The left end of the shaft 55, has secured thereon, a sprocket wheel 63, which is connected by a sprocket chain 64, with a larger sprocket wheel 65, on the shaft 20, of the conveyer 2, whereby the said chain 64, is caused to travel in the same direction as the conveyer 2, and as this chain turns the shaft 55, and its sprocket wheels 57, it follows that the chains 58, are also caused to travel in the same direction as the conveyer 2.

A bent rod 66, connects the rock arms 43, near their upper ends, and is therefore longer than the distance between the arms. A ring 67, is placed on this rod, and to this ring one end of a cord 68, is secured; this cord passes over a pulley 69, on the adjacent upper cross bar 31, and its opposite end carries a weight 70, which is housed in a tubular guide 71, which is secured to the floor, and which keeps the weight from swinging as it rises and falls.

The weight 70, does not touch the floor at any time, and therefore exerts a continuous pull on the cord 68, and arms 43. A cord 72, is secured at one end to the rod 51, which connects the upper ends of the arms 43, and this cord passes over a pulley 73, on a shaft 74, which is mounted in bearings on the adjacent uprights 28, and to its opposite end is secured a weight 75. The cord 72, is of such a length that the weight 75, reaches the floor before the swinging members reach the position shown in dotted lines in Fig. 1, hence the said weight ceases to exert a pull on the cord 72, before the arms 43, reach the limit of their rearward swinging movement, or about the time they reach the dead center line of their movement, and for the remainder of the rearward movement of the arms the cord remains slack, for a purpose which will hereinafter appear. The weight 75, is also prevented swinging by a tubular guide or housing 76, which surrounds it, and which is secured to the floor.

Upright arms 77, are secured to the side bars 29, and these arms extend above the upper laps of the chains 58, and are adapted to engage and stop the pans before the receiving arms reach the limit of their rearward movements, as will later appear.

Above the discharge end portion of the conveyer 1, there is secured a semi-circular hood 78, of suitable length, at the forward end of which an electric fan 79, is placed, and this fan may be used when necessary as an additional means of cooling the cakes before they leave the conveyer 1, the hood serving to confine the air draft created by the fan, and direct it against the approaching pans of cakes.

The frame of the cooling conveyer is arranged to support the upper and lower laps of the said conveyer, so as to prevent sagging of the same, and the side bars 80, of this frame are provided with pan guides 81, which are secured to the inner faces of the bars above the discharge end of the conveyer. These guides comprise resilient metal strips, which are secured at their rear ends to the bars, by bolts 82, and their forward ends are sprung inward, the space between them being slightly greater than the length of the pans, so that pans which are not properly centered on the conveyer 1, will be engaged by the inwardly sprung arms of the guides as the said pans reach the discharge ends of the conveyer, and will thereby be properly centered as they pass on to the receiving arms 49.

The guides 81, are sprung inward by bolts 83, which extend through the side rails 80, and through metal plates 84, which are secured to the side rails, and the ends of these bolts bear against the guides. By this means the guides can be properly spaced with relation to the length of the pans, and held against outward springing movement.

In order to prevent the pans from coming in contact with the teeth of the sprocket wheels 5, as the said pans pass off from the conveyer 1, I provide curved guards 85,—see Figures 3 and 4,—which are secured at one end to a cross bar 86, which connects the lower ends of the depending frame supports 9. The guards lie close to the wheels 5, and the pans slide on the curved faces thereof, as they leave the conveyer 1, and are received by the arms 49.

Guards 87, are also secured to the tables 26, of the return conveyer frame 16, and prevent the pans from contacting with the sprocket wheels 59, as the said pans pass from the chains 58, to the conveyer 2.

As the pans leave the chains 58 their forward edges are received by downwardly inclined slide rods 88, which are secured to the tables 26, and parallel with the run of the conveyer. These rods cause a gradual transition in the passing of the pans from the chains 58, to the conveyer 2. Their highest points are above the level of the conveyer and their lowest points are below the level of the conveyer, and when the pans slide forward on the rods, the forward ends of the said pans are caught by the conveyer, and the pans thus pass from the rods on to the conveyer, without any breaks in their motion.

The operation of the improved conveying and transferring mechanism is as follows: The pans of cakes or other articles are removed from the oven by an attendant, and placed on the conveyer 1, between the slats 12, and are carried forward to the discharge end of the said conveyer. As each pan discharges from the conveyer, the receiving arms 49, of the transferring mechanism are in the position shown in full lines, Fig. 1, and the pan slides on to the said arms until it is engaged by the stops 54.

The cam levers 37, which rotate continuously, now engage the rock levers 38, which are thereby swung on their pivot rod 39, and the receving arms 49, with the pan thereon, are also swung backward, as well as the rock arms 43, which are pivotally connected to the rear end of the arms 49. As the rock levers 38, swing from vertical to inclined positions, their upper ends, which connect with the receiving arms 49, necessarily move from higher to lower planes; and as the rock arms 43, swing from inclined positions to and slightly beyond vertical positions, their upper ends, which connect with the rear ends of the arms 49, necessarily move from lower to higher planes. Thus, as the arms 49, with a pan thereon, are swung backward or away from the discharge end of the conveyer 1, their forward ends are at the same time, lowered to a plane below the level of the chains 58, while their rear ends are raised above the level of the said chains 58, and the pan, carried by the said arms, is caught by the said chains and carried forward until it is received by the conveyer 2.

By the time the pans are deposited upon the conveyer 2, the cakes or other articles are cool enough for handling, and they are emptied from the pans onto the tables 26, by attendants who stand along the tables on each side of the conveyer. After the pans are emptied they are placed again upon the conveyer 2 which carries them back to a point slightly beyond the receiving end of the conveyer 1, where they are removed, greased, and replenished with fresh dough. The cakes on the tables are packed in boxes preparatory to shipping.

As the arms 49, are swung back, by the engagement of the cams 37, with the levers 38, the weight 70, exerts a pull on the arms in a counter direction to their movement, but the weight 75, neutralizes the pull of the weight 70, and thus relieves the pressure against the cams 37. As the arms 43, reach the vertical or dead center line, the weight 75, reaches the floor, and ceases to exert any pull on its cord 72, but the cams 37, are still in engagement with the levers 38, and the arms 43, are swung beyond their vertical or dead center lines, as the cams move out of engagement with the levers 38.

The weight of the arms 49, is now all on one side of the pivotal points of the levers 38, and arms 43, and as the cams 37, move out of engagement with the arms 38, the cord 68, is drawn upon by the weight 70, to swing the arms in the reverse direction, but a slight pull in addition to that exerted by the weight 70, is necessary to swing the arms 43, beyond their vertical positions, and for this purpose, I connect the cross rod 51, with the pivot rod 39, by a loose cord 87, to which a light weight 88, is attached, and by this weight in addition to the weight 70, the receiving arms 49, are swung forward again until the arms 43, swing past their vertical or dead center lines, when the weight of the arms 49, is shifted to the opposite side of the pivot 44, of the arms 43, and this shifting of the weight of the arms 49, would permit the weight 70, to throw the said arms suddenly forward; but as the arms 43, pass their dead center line, the slack in the cord 72, is taken up, and the weight 75 now acts to counterbalance the weight 70, and prevent the too rapid forward movement of the receiving arms 49, and these arms are limited in their forward movement by the engagement of the lower ends of the levers 38, with stops in the form of rubber blocks 89 which are secured to angle plates 90 which are adjustably secured to an angle bar 91, that is secured to the uprights 28. The block 89 may be adjusted, and also held at any point of adjustment, by a bolt 92 which is threaded to an angle plate 93 which is bolted to the angle bar.

As each pan is swung back and away from the conveyer 1, its rear edge is engaged by the upright stop arms 77, and further backward movement of the pan is prevented, but the receiving arms continue to move backward, and are thereby dropped below the level of the chains 58, thus depositing the said pan upon the chains, which carry the pan forward and deliver it upon the conveyer 2, as previously described.

As the cam shaft 33, is driven from the shaft 7, of the conveyer 1, its rotations always bear a fixed ratio to that of the shaft 7; and the same is also true regarding the rotation of the shaft 55 with respect to the shaft 20, of the conveyer 2, from which the said shaft 55 is driven.

The holes 48, in the arms 43, and the holes 42, in the levers 38, permit the said arms and levers to be so adjusted as to their pivotal points, that a suitable inclination and swinging movement will be given to the receiving arms, relatively to the plane and inclination of the chains 58, upon which the pans are deposited.

The weights 70 and 75, have threaded apertures in their lower ends, in which are screwed the threaded stems 94 of small weights 95 should the main weights prove too light, and the small weights 95 are also provided with threaded apertures to receive the threaded stems of other small weights, as will be understood by reference to Fig. 9.

Having described my invention, what I claim as new and desire to secure by Letters Patent is:—

1. In a machine of the character described, the combination with oppositely moving, pan-forwarding conveyers, arranged one above the other, of a frame in line with the lower conveyer, a shaft on said frame, a shaft supported above the adjacent end portion of the lower conveyer, sprocket wheels on said shafts and chains connecting said wheels; the shaft on said frame being driven from said conveyer and in the same direction, arms pivoted to said frame between said chains for receiving pans from the top conveyer, cams for swinging said arms out of receiving position and below the level of said chains, whereby the pans are deposited upon the chains, which deliver them to the lower conveyer, said pans being of greater length than the space between the chains; weights for swinging said arms back into pan-receiving position, and means operated by the upper conveyer for actuating said cams.

2. In a machine of the character described, the combination with oppositely moving, pan-forwarding conveyers, arranged one above the other, of a frame in line with the lower conveyer, a shaft on said frame, a shaft supported above the adjacent end portion of the lower conveyer, a sprocket and chain connection between said shafts, the shaft on said frame being driven from the lower conveyer and in the same direction, rock arms pivoted to said frame, arms pivotally connected to the upper ends of said rock arms, and positioned between said chains, for receiving pans from the top conveyer, a shaft on the frame driven from said top conveyer, rotatable cams on said shaft for swinging the forward rock arm, whereby the pan-receiving arms are swung out of pan receiving position and below the level of the chains, said chains acting to receive the pans and deposit them upon the lower conveyer, weights for swinging said arms to their initial positions and means for arresting said arms in such position.

3. In a machine of the character described, the combination with oppositely moving, pan-forwarding conveyers, arranged one above the other, of swinging members for receiving pans from the upper conveyer, adjustable guides for centering the pans as they leave the upper conveyer, stops on the swinging members for arresting the pans as they are received from the conveyer, cams for moving the swinging members out of pan-receiving position, endless carriers for receiving the pans from the swinging members, and depositing them upon the lower conveyer, weights for moving the swinging members back into pan-receiving position, and means for stopping swinging members in such position.

4. In a machine of the character described, the combination with oppositely moving, pan-forwarding conveyers, arranged one above the other, of pivoted arms for receiving pans from the upper conveyer, adjustable resilient guides for centering the pans as they leave the said conveyer, pan stops on said pivoted arms, endless carriers which extend alongside said pivoted arms and over the adjacent end of said lower conveyer, cams for swinging said pivoted arms out of pan-receiving position, whereby they deposit the pans on said endless carriers, which deposit them on the lower conveyer, a sprocket and chain connection operated by said lower conveyer, for operating said endless carriers, a sprocket and chain connection operated by the upper conveyer for actuating said cams, weights for restoring the swinging arms to pan-receiving position, and stops for arresting further movement of said arms.

5. In a machine of the character described, the combination with oppositely moving, pan-forwarding conveyers, arranged one above the other, swinging means for receiving pans from the upper conveyer, and endless carriers for receiving pans from the swinging means and depositing them upon the lower conveyer, of cams for moving said swinging means into pan-delivering position, counterbalancing weights which exert a pull in opposite direction upon said swinging means, the pull in the return direction being stronger than the pull in the opposite direction, whereby the swinging means are moved again into pan-receiving position, during the non-actuating movement of the cams.

6. In a machine of the character described, the combination with oppositely moving, pan-forwarding conveyers, arranged one above the other, a frame in line with the lower conveyer, upright rock arms pivoted to said frame, horizontally disposed parallel arms and cross rods which pivotally connect the upper ends of said rock arms and said horizontally disposed arms, said latter arms being adapted to receive pans from said upper conveyer, a shaft on said frame, having sprocket wheels thereon, a shaft supported above the adjacent end of said lower conveyer, having sprocket wheels thereon, chains extending alongside said pan-receiving arms, and connecting the sprocket wheels on said shafts, said first mentioned shaft having a chain and sprocket connection with said lower conveyer, of a cam shaft having a chain and sprocket connection with the upper conveyer, rotating cams thereon for swinging said rock arms, whereby the pan-receiving arms are moved out of pan-receiving position and below the level of the said chains, whereby the pans are caught by said chains and deposited upon said lower conveyer; pulleys on said frame, cords connected to the rear rock arms and extending in opposite directions over said pulleys and having weights on their free ends, which exert a pull in opposite directions upon said pan-receiving arms, the weight pulling in return direction being heavy enough to overcome the pull of the other weight, whereby the pan-receiving arms are moved again into pan-receiving position, during the non-actuating movement of the cams.

7. In a machine of the character described, a frame, pairs of rock arms pivotally mounted on said frame, the front pair being vertically disposed, while the rear pair incline toward the front pair, cross rods connecting the upper ends of said pairs of arms and horizontally disposed arms pivotally mounted on said cross rods; pulleys on the frame, cords connected to the rear rock arms and extending in opposite direction over said pulleys, weights on the ends of said cords, which exert a pull in opposite directions on said rock arms; rotatable cams for engaging the front rock arms, whereby they are swung to inclined positions, while the rear rock arms are swung to points slightly beyond the vertical, by which the horizontally disposed arms are swung backward and given a downward inclination toward their forward ends, the weight pulling in the return direction being heavy enough to overcome the pull of the other weight, whereby the arms are returned again to their initial positions, during the non-actuating movement of the cams; in combination with a conveyer for supplying pans to the horizontally disposed arms, means for receiving the pans from said arms, and a conveyer for receiving the pans from the latter means.

8. In a machine of the character described, the combination with oppositely moving, pan-forwarding conveyers, arranged one above the other, of a frame, a pan receiver in swinging engagement with the frame and adapted to receive pans of cakes from the upper conveyer, endless chains alongside said receiver and extending to said lower conveyer, means for swinging the receiver rearward out of receiving position and below the level of the said chains, whereby the pans are deposited upon the chains, by which they are carried to the lower conveyer, stops on the receiver for engaging the pans as they come from the upper conveyer, stops on the frame for engaging the pans as the receiver moves rearward, pulleys on the frame, cords connected to the receiver and extending in opposite directions over said pulleys, and counterbalancing weights on said cords, the forwardly pulling weight exerting a continuous pull, while the opposite weight reaches the floor before the receiver reaches the limit of its rearward movement, said forwardly pulling weight being sufficient to swing the receiver into pan-receiving position, during the non-actuating period of the swinging means.

In testimony whereof I affix my signature in presence of two witnesses.

PETER RASMUSSEN.

Witnesses:
G. SARGENT ELLIOTT,
AMY E. NACE.